3,532,667
POLYAMIDES STABILIZED WITH PHOSPHONIUM HALIDES

Gurdial Singh, Wilmington, Del., assignor to E. I. du Pont de Nemours and Company, Wilmington, Del., a corporation of Delaware
No Drawing. Filed May 31, 1967, Ser. No. 642,344
Int. Cl. C08g *51/58, 51/60*
U.S. Cl. 260—45.8         5 Claims

---

ABSTRACT OF THE DISCLOSURE

A triphenyl phosphonium halide composition for use as an antioxidant in polyamides in concentrations ranging from 0.05% to 5% by weight of polymer. Representative compositions are:

$$[R_3P-CH_2-R']^+X^-$$

and $$[R_3P-NH-R'']^+X^-$$

wherein R, R' and R'' are phenyl and X is bromine or chlorine.

---

BACKGROUND OF INVENTION

Field of invention

This invention relates to synthetic high-molecular weight polycarbonamides having improved resistance to oxidative degradation, and more particularly to triphenyl phosphonium halide compounds for incorporation as antioxidants into polycarbonamides.

Discussion of prior art

Synthetic polycarbonamides are well known for their outstanding properties in many end uses such as in textile fibers and molded articles. Frequently in such uses the polymer is subjected to elevated temperatures which in the presence of air results in oxidative degradation and a consequent loss of strength and other desirable physical properties. Additives commonly known as antioxidants may be incorporated in the polymers to reduce this degradation.

The prior art shows that certain phosphonium compounds are known to have antioxidant properties (British Pat. 1,012,796) useful in gasolines and lubricating oils; but their use is not shown in polyamides. Other uses disclosed in the art for triphenyl phosphonium compounds containing a polymer reactive functional group are viscosity stabilizers and dye modifiers (South African specification 2949/65). As shown in the following specification, antioxidant effectiveness depends upon the organic radicals of the phosphonium group and also the identity of the anion. The references do not teach the particular properties necessary to create an effective antioxidant composition for incorporation into polycarbonamides.

SUMMARY OF THE INVENTION

This invention provides a high-molecular weight synthetic polycarbonamide containing an effective amount of a triphenyl phosphonium halide antioxidant composition selected from the group consisting of:

(I)     

(II)    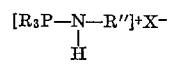

and (III)   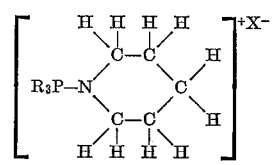

wherein:
R is phenyl,
R' is hydrogen or aryl,
R'' is aryl, and
X is chlorine, bromine or iodine.

Compounds of particular interest are those of Formulae I and II in which R' and R'' are phenyl and X is chlorine or bromine. R, R' and R'' are free of functional groups which are capable of reacting with the polycarbonamide under normal processing conditions.

EXAMPLE

This example is intended to be illustrative of the instant invention by setting forth, in addition to preparation of a preferred embodiment, comparative data showing results obtained with the claimed compositions.

A solution of the appropriate phosphonium compound of the desired concentration in 5 to 10 ml. of chloroform is pured onto approximately 200 grams of poly(hexamethylene adipamide) flake, having a relative viscosity of 36 in an 8.4% by weight solution of 90% formic acid, in a test tube. The chloroform is removed under vacuum and the contents thoroughly flushed with dry nitrogen. The tube is then heated in a refluxing bath of dimethyl phthalate (boiling point 283° C.) under a nitrogen atmosphere. After the polymer melts the mixture is stirred for about 10 minutes. The polymer is allowed to cool, removed from the tube and ground into flake which is dried overnight at 110° C. in an oven under a nitrogen atmosphere. The polymer flake containing the desired amount of the phosphonium compound is melt spun in a conventional manner into 10 filament yarns of about 500 denier. The yarn is drawn 4× and plied to a total denier of about 1000 to 1200 and then subjected to a jet stream-bulking treatment. The bulked yarn samples are then tested for resistance to degradation upon exposure in a forced air oven at 180° C. and in a weatherometer (at 60±2° C.) for different periods of time. The samples are then tested for breaking strength and the percent tenacity retained as compared to the unexposed yarn calculated.

The weatherometer is a model Atlas XW with sunshine carbon elements, commercially available from the Atlas Electric Devices Company, Chicago, Ill. It is operated with and without a moisture spray (wet and dry cycles). Thermal and photostability results are summarized in the following table.

Items 4 and 5 show that replacement of the halogen anion by another anion seriously reduces effectiveness of the phosphonium compound. The table shows that the most effective compounds overall after prolonged ex-

| Item | Triphenyl phosphonium compound formula | | | Added conc., percent | Percent tenacity retained | | | | |
|---|---|---|---|---|---|---|---|---|---|
| | | | | | Heat aging at 180° C. | | | Weatherometer, 100 hrs. | |
| | No. | R' or R'' | X- | | 3 hrs. | 12 hrs. | 24 hrs. | Dry cycle | Wet cycle |
| 1 | I | Hydrogen | Br | 0.5 | 75 | 56 | | | 80 |
| 2 | I | Phenyl | Br | 0.5 | 87 | | 66 | 78 | 82 |
|   |   |   |   | 1.0 | 91 | 80 | 72 | | |
| 3 | I | Phenyl | Cl | 0.5 | 99 | 79 | 79 | 65 | 78 |
| 4 | I | Phenyl | BF$_4$ | 0.5 | 63 | | *0 | | |
| 5 | I | Phenyl | B(Phenyl)$_4$ | 0.5 | 74 | | *0 | | |
| 6 | II | Phenyl | Br | 0.5 | 92 | 76 | 63 | 78 | 88 |
|   |   |   |   | 2.0 | 88 | 79 | 69 | | |
| 7 | II | 1-naphthyl | Br | 0.5 | 82 | 65 | 56 | | |
|   |   |   |   | 1.0 | 94 | 76 | 78 | | |
| 8 | II | Cyclohexyl | Br | 0.5 | 55 | 5 | *9 | 18 | 77 |
| 9 | III | | Br | 0.5 | 87 | 77 | 54 | 8 | 56 |
| 10 | | No additive | | *0 | *0 | | *0 | | 58 |

*Substantially complete degradation.

GENERAL DESCRIPTION

The phosphonium compounds are prepared by known reactions. For example, benzyltriphenylphosphonium bromide can be prepared by a metathesis reaction with saturated solutions of benzyltriphenylphosphonium chloride and sodium bromide in methyl alcohol. When saturated solutions of the two salts are mixed, the phosphonium bromide separates in almost quantitative yields. The aminophosphonium compounds of Formulae II and III can be prepared by the reaction of dibromotriphenyl phosphorane with the appropriate amine in the presence of triethyl amine. Dibromotriphenyl phosphorane is prepared by adding a benzene solution of bromine to a solution of triphenyl phosphine, also in benzene, at 0° C. The dibromotriphenyl phosphorane separates as a white solid and can be reacted in situ with the appropriate amine, such as phenylamine, 1-naphthylamine, piperidine and cyclohexyl amine, in the presence of triethyl amine. Excess ethyl ether is then added to the reaction mixture to ensure complete separation of the phosphonium salt, which can then be collected by filtration. Triethylammonium bromide is removed by washing the solid with ice-cold water and the phosphonium bromide can be recrystallized from a mixture of chloroform and ethyl acetate.

The phosphonium halide compound can be incorporated in the polycarbonamide by any convenient manner. It can be mixed with the polycarbonamide-forming raw materials prior to polymerization or added and blended with the polymer prior to final processing into the particular end use desired, such as by extrusion or melt-spinning into filaments.

By "an effective amount" of the claimed composition, it is meant a concentration of the phosphonium halide compound sufficient to produce a significant increase in oxidative stability of the polycarbonamide composition. Effectiveness varies depending upon the structure of the compound but beneficial results are normally obtained with a concentration of at least about 0.05% by weight of the polymer. A highly effective concentration range is from about 0.2 to about 2%. Normally, no more than about 5% of the compound is required to achieve the maximum desired level of protection.

The polycarbonamide compositions of this invention may be prepared from any polycarbonamides such as those derived from polymerizable mono-amino carboxylic acids or their amide-forming derivatives and those derived from the reaction of diamines with dicarboxylic acids or their amide-forming derivatives. Suitable such polycarbonamides are those disclosed for example in U.S. Pats. 2,073,253, 2,130,523 and 2,130,948. Additional polycarbonamides are those containing cycloaliphatic linkages within the polymer chain such as the polymers from dicarboxylic acids containing from 6 to 14 carbon atoms and bis (4-aminocyclohexyl)methane or piperazine. Also such polymers may contain aromatic linkages such as the polymers from aliphatic diamines and iso- and terephthalic acids. Also, copolymers and polymer mixtures containing a polycarbonamide are included.

These polycarbonamide compositions may additionally contain other stabilizing and modifying additives and be used in a variety of applications including molded articles, extruded articles and filamentary articles. It is apparent that a particular polycarbonamide may be selected in any given application without departing from the spirit of the present invention which is to be limited only by the scope of the appended claims.

What is claimed is:

1. A high-molecular weight synthetic polycarbonamide having recurring amide groups as integral parts of the main polymer chain containing an effective amount of a triphenyl phosphonium halide antioxidant composition selected from the group consisting of (I) $$\left[ R_3P-\underset{H}{\overset{}{N}}-R'' \right]^+ X^-$$

and (II) 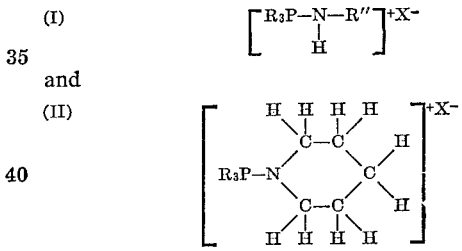

wherein:
R is phenyl,
R'' is aryl, and
X is chlorine, bromine or iodine.

2. The composition of claim 1 wherein the said antioxidant composition is present in an amount greater than 0.05% by weight, based on the weight of said polycarbonamide.

3. The composition of claim 1 wherein the said antioxidant composition is present in an amount in the range of 0.2% to 2% by weight, based on the weight of said polycarbonamide.

4. The composition of claim 3 wherein said polycarbonamide is poly(hexamethylene adipamide).

5. The composition of claim 3 wherein the antioxidant composition has structure I, wherein R and R'' are phenyl and X is bromine or chlorine.

References Cited
UNITED STATES PATENTS

| | | | |
|---|---|---|---|
| 3,131,204 | 4/1964 | Sisler et al. | 260—448.2 |
| 3,268,323 | 8/1966 | Goyette | 260—606.5 |
| 3,309,425 | 3/1967 | Gillham et al. | 260—893 |
| 3,320,321 | 5/1967 | Grayson et al. | 260—583 |
| 3,374,288 | 3/1968 | Lange | 260—857 |
| 3,379,676 | 4/1968 | Ashton et al. | 260—45.8 |

DONALD E. CZAJA, Primary Examiner

R. A. WHITE, Assistant Examiner

U.S. Cl. X.R.

260—45.7, 45.9